Figure 3:
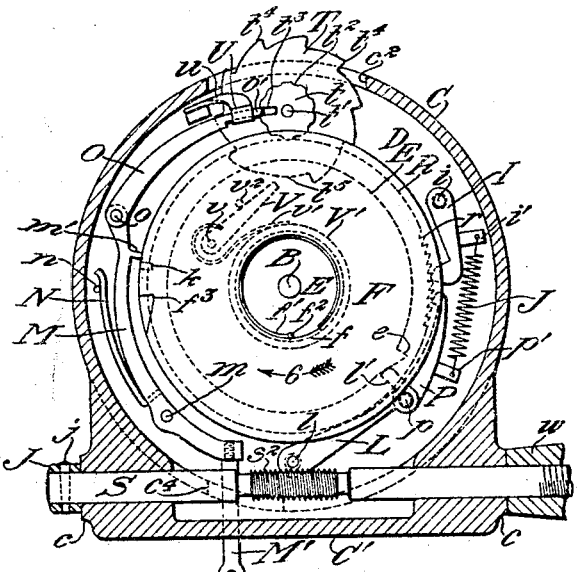
Figure 4:
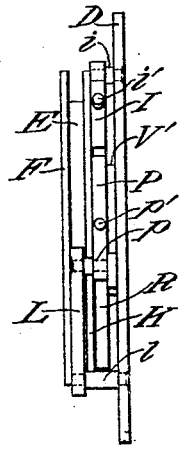

C. A. BRINK.
INDICATOR AND STOP DEVICE.
APPLICATION FILED APR. 22, 1916.
1,286,927.
Patented Dec. 10, 1918.
2 SHEETS—SHEET 1.
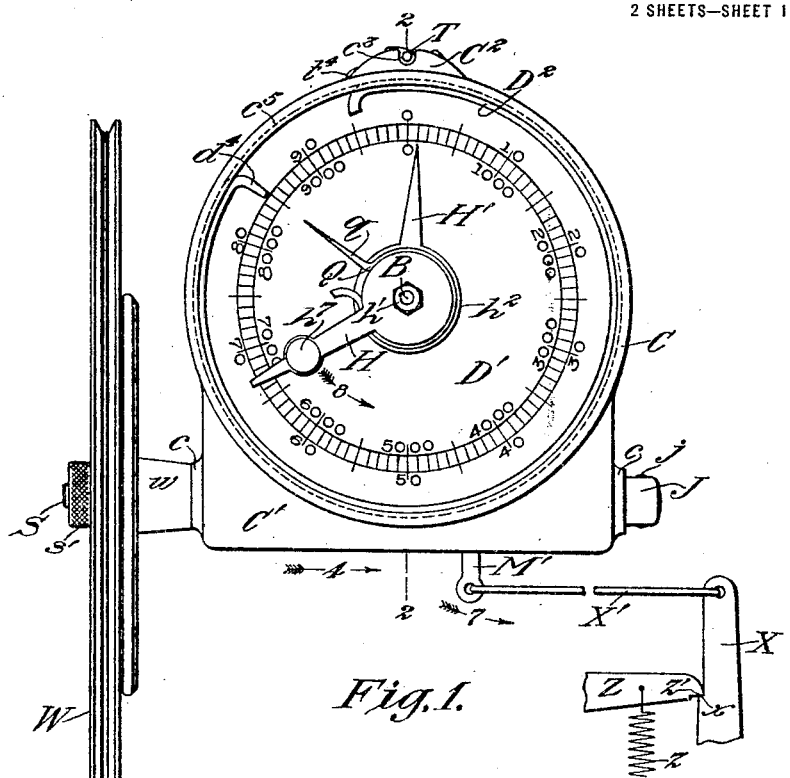
Fig. 1.
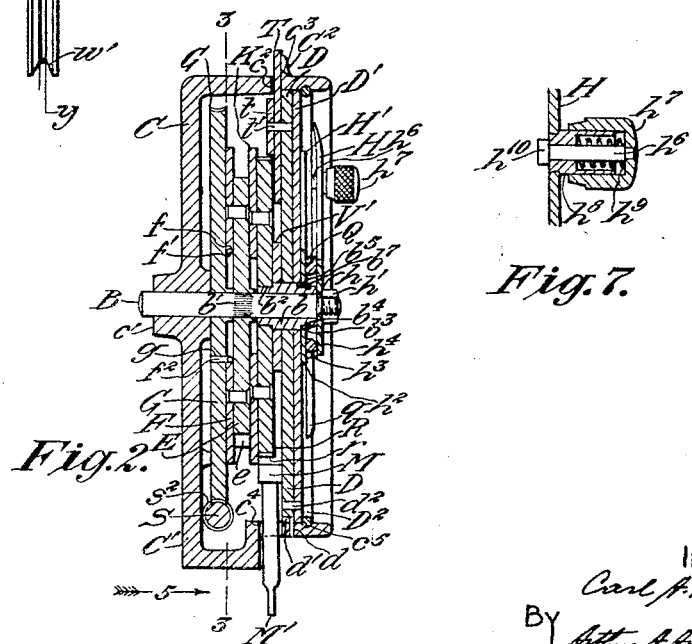
Fig. 2.
Fig. 7.
INVENTOR
Carl A. Brink
BY
ATTORNEY

C. A. BRINK.
INDICATOR AND STOP DEVICE.
APPLICATION FILED APR. 22, 1916.

1,286,927.

Patented Dec. 10, 1918.
2 SHEETS—SHEET 2.

INVENTOR
Carl A. Brink
BY
Arthur P. Arrington
ATTORNEY

UNITED STATES PATENT OFFICE.

CARL A. BRINK, OF PROVIDENCE, RHODE ISLAND.

INDICATOR AND STOP DEVICE.

1,286,927.      Specification of Letters Patent.      Patented Dec. 10, 1918.

Application filed April 22, 1916. Serial No. 92,994.

*To all whom it may concern:*

Be it known that I, CARL A. BRINK, a citizen of the United States, residing at Providence, in the county of Providence, State of Rhode Island, have invented certain new and useful Improvements in Indicators and Stop Devices, of which the following is a specification.

My invention is an improved indicator and stop-device adapted for use in measuring the yardage of textiles and other materials; for counting the operations of a machine or apparatus; and for arresting the action of any mechanism to which it is applied after any predetermined number of operations of the same.

The object of my improvement is to simplify the construction and reduce the number of parts of devices of this type while providing for a more positive and accurate operation of the mechanism and an easier and more convenient means for resetting it.

The manner and means for accomplishing these objects are fully described in the following specification, illustrated by the accompanying drawings, in which like reference characters designate like parts. In the drawings:—

Figure 1 is a front view of my improved device showing it applied to use as a yardmeter and illustrating it connected with the stop-controlling mechanism of the machine with which it is used;

Fig. 2, a vertical, sectional view of the registering-mechanism of the device taken on the line 2—2 of Fig. 1, looking in the direction indicated by the arrow 4;

Fig. 3, a vertical, sectional view taken on the line 3—3 of Fig. 2, looking in the direction indicated by the arrow 5; and Figs. 4, 5, 6 and 7, views illustrating details of the mechanism.

Referring first to Fig. 1, my improved device is here illustrated as adapted for use as a yard-meter for measuring the yardage of a traveling yarn or cord $y$ which passes over the driving-wheel or pulley W to rotate the latter. The registering-mechanism of the indicator which is driven from the wheel W is inclosed in a casing C which may be mounted on a bracket or attached directly to the machine with which the device is to be used. Preferably the casing C is circular in form and provided with a depending trough-like portion C', see Figs. 2 and 3, which serves as an oil-reservoir for the operating parts of the mechanism contained therein. The lower portion C' of the casing C is formed with end-bearings $c$—$c$ for a horizontal shaft S which is held in place by a collar J, secured thereto at one end by the pin $j$, and the hub $w$ of the drive-pulley W at its opposite end. The wheel W has its periphery scored with a V-shaped groove $w'$ adapted to receive the yarn $y$ which is usually given several turns around its circumference and the hub $w$ of the pulley is screwed onto the shaft S and held in place by a check-nut $s'$, see Fig. 1. At its center the shaft S is cut with a helical screw $s^2$ or it might be arranged to carry a separate worm keyed in place thereon. Meshing with the worm or screw $s^2$ is a worm-wheel or gear G which serves as the main driving-element for the registering-mechanism of the device.

The worm-wheel G is mounted free to turn on a pin or shaft B which extends axially through the casing C with its rearward end rotatably mounted in a hub $c'$ on the rear wall of the casing. On the forward end of the shaft B is a collar or bushing $b$ mounted to turn freely in its bearing in a plate or diaphragm D which is secured in the front end of the casing C. The plate D is fitted snugly within the rim of the casing C and held in place by a pin $d$ driven therethrough and engaging a slot $d'$ in its edge, see Fig. 2. Secured to the front of the plate D by means of the dowel $d^2$ is a thinner plate or dial D' on the front of which are the index graduations and numerals for recording the operations of the device, see Fig. 1.

At a point intermediate its ends the shaft B is knurled or scored to form projecting splines $b'$, see Fig. 2, and driven onto this portion of the shaft is a disk E held rotatively therewith. Riveted to the rear face of the disk E is a circular, ring-like plate F adapted to set against the front face of the worm-wheel G and acting to hold the latter against the front end of the hub $c'$ of the casing C. Referring particularly to Figs. 2 and 3, the inner edge of the ring-plate F is scored with a shallow groove $f$ in which is seated a wire spring $f'$ having one of its ends $f^2$ bent at right-angles and inserted through a hole $g$ in the worm-wheel G. The wire spring $f'$ acts as a friction clutch to cause the disk E to be driven from the worm-wheel G while also allowing it to be turned in one direction free of the worm-gear. When the worm-wheel or gear G is driven in the direction indicated by the arrow 6, Fig. 3, the tendency will be to expand the spring $f'$ radially to cause it to frictionally grip the interiorly-grooved edge of the plate F whereby the disk E will be rotated from the gear. On the other hand, when the disk E is turned in the same direction, manually, in setting the registering elements as later described, the effect will be to contract the spring $f'$ inwardly toward the axis of the disk to release its grip on the plate F and allow the latter to slide around the spring while the gear G is held from rotation.

Forced onto the inner end of the bushing $b$ and riveted thereto by flanging over the edge of the bushing at $b^2$ is a ratchet-disk R, see Fig. 2. Riveted to the back of the ratchet-disk R is a circular ring-like plate K of the same diameter as the plate F on the disk E. The ratchet R is formed on its periphery with teeth $r$ adapted to be engaged by the pointed end of a pawl I pivoted on a pin $i$ driven into the diaphragm D, see Figs. 3 and 4. The pawl I acts to restrain the ratchet-disk R from rearward rotation while allowing it to be turned in the direction indicated by the arrow 6, Fig. 3. The ratchet-disk R is driven with a step-by-step motion by means of the hooked pawl P which is pivoted at $p$ on the end of an arm or lever L. A coiled spring J stretched between pins $i'$ and $p'$ projecting from the pawls I and P acts to hold the latter with their ends in yielding engagement with the teeth on the ratchet-disk R. The arm or lever L is pivoted on a pin $l$ driven into the diaphragm D, see Fig. 4, and is formed at its opposite end with a wiper-finger $l'$ arranged to bear on the periphery of the frictionally-driven disk E. Formed on the edge of the disk E, see Fig. 3, is an inclined projection or tooth $e$ adapted to ride under the wiper $l'$ of the lever L to rock the latter radially away from the axis on which the disk turns. The tooth $e$ is proportioned to move the lever L to an extent sufficient to operate the pawl P to advance the ratchet R one tooth at a time. It will be obvious, therefore, that each complete rotation of the disk E will cause the ratchet R to be advanced through a distance equal to the length of one tooth, and therefore as many rotations of the disk E as there are teeth on the ratchet R will be required to turn the latter through a complete revolution. As here arranged the ratchet R has one-hundred teeth on its periphery corresponding with the number of graduates on the face or dial D' of the device as later explained.

Figure 5:
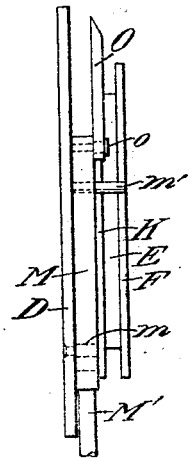

Referring to Fig. 3, at the left-hand side of the casing C is a lever M pivoted on a pin $m$ driven into the diaphragm D as shown in Fig. 5. At its upper end the lever M is formed with a projection or finger $m'$ adapted to bear on the peripheries of the plates K and F carried by the ratchet R and disk E. A wire spring N secured at one end in the lever M is arranged with its opposite end engaging a pin $n$ driven into the diaphragm D and acts to force the lever M against the edges of the plates K and F. The plate K on the ratchet-disk R is formed with a notch $k$ cut into its peripheral edge and adapted to receive the finger $m'$ when the disk R is turned to bring the notch into alinement therewith. The plate F on the disk E also has its periphery notched at $f^3$, one side of the notch being beveled as shown in Fig. 3. The lever M is only allowed to be rocked by its spring N when the two notches $k$ and $f^3$ come into register and the purpose of the inclined face in the notch $f^3$ is to raise the finger $m'$ out of the notch $k$ as the disk E is turned by hand to set the device as later described.

Pivoted at $o$ on the upper end of the lever M is an arm O arranged with its end adapted to slide in a bearing U supported by an arm $u$ reaching out from the rear face of the diaphragm D. The reduced end $o'$ of the arm O is adapted to ride on the fluted periphery of a hub $t$ which projects from the side of a toothed wheel T. The wheel T is pivoted on a pin $t'$ driven into the diaphragm D with its rim projecting through an opening $c^2$ in the top of the casing C, see Figs. 2 and 3. As the end of the arm O rides into the depressions on the periphery of its hub $t$ it tends to restrain the wheel from too free rotation while allowing it to be turned notch by notch. At one point on its circumference the hub $t$ is formed with a deeper notch $t^3$ which allows the arm O to slide to the right to a considerable extent. The notch $t^3$ coöperates with the notches $f^3$ and $k$ on the plates F and K to allow the rocking movement of the lever M under action of its spring N for a purpose as later explained. It will be understood that the finger $m'$ on the lever M can enter the notches $k$ and $f^3$ only when the notch $t^3$ in the hub $t$ is in the position shown in Fig. 3.

Figure 6:
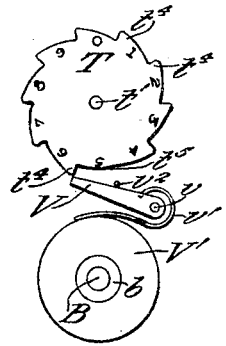

The wheel T and its hub $t$ serve as an auxiliary device for extending the range of action of the registering-mechanism and may be used when required, or left inactive during the operation of the other parts of the apparatus. It is to be noted that the wheel T has its periphery divided into ten parts with equally spaced teeth $t^4$, $t^4$, etc., projecting therefrom. One tooth, however, is missing at $t^5$ leaving only nine teeth in all. The front face of the wheel T is numbered with ten numerals from "0" to "9" one numeral only showing at a time through an opening $c^3$ in a fin or plate $C^2$ projecting from the top of the casing C, see Fig. 1. When the mark "0" is showing as illustrated in Fig. 1 the hub $t$ on the wheel T will be turned to the position illustrated in Fig. 3, and the arm O will be free to slide to the right to enter its end in the notch $t^3$. With the parts in this position the wheel T will remain inactive as next explained: Referring to Fig. 3, the wheel T is rotated from a pawl V pivoted at $v$ on the front face of the ratchet-disk R. A wire spring $v'$ is fastened at one end to the pawl V with its opposite end bearing against the periphery of a hub or washer V' mounted on the bushing $b$ between the disk R and diaphragm D; see Fig. 2. The spring $v'$ acts to hold the pawl V against a stop-pin $v^2$ carried by the ratchet-disk R so that normally the pawl will be maintained in the position illustrated in Figs. 3 and 6. With the wheel T turned to indicate "0" as illustrated in Fig. 1, the missing-tooth portion $t^5$ of its rim will be positioned as shown in Fig. 3 and with the parts in this relation the pawl V will be inactive as regards its function for turning the wheel. That is to say, as the pawl V is revolved around the axis of the ratchet-disk R during the rotation of the latter, the end of the pawl V will just clear the first tooth $t^4$ on the wheel T as shown in Fig. 6 so that the wheel will remain stationary. When, however, it is desired to make use of the wheel T to register a greater number of operations than can be indicated on the dial D the wheel T is set by hand to bring any one of its numerals into indicating position at the opening $c^3$. This manual operation of the wheel T will bring one of its teeth $t^4$ into position to be engaged by the pawl V on the ratchet R so that the wheel will be turned one tooth at a time at each rotation of the ratchet. In this manner the notch $t^3$ in the hub $t$ of the wheel T will be brought into register with the end of the arm O after any certain number of movements of the wheel T in accordance with the number at which the same is set. Through this arrangement the operation of the lever M is delayed until after the ratchet R has made any desired number of rotations from one to ten. It will thus be seen that the number of operations registered by the ratchet-disk R may be multiplied by any number up to ten by setting the wheel T as required, the coöperation of these elements of the mechanism being more fully explained hereinafter.

The lever M which is caused to act at a predetermined time according to the setting of the registering-mechanism serves as a stop-control for operating the stopping-devices of the machine to which the indicator is attached. Referring to Fig. 3 an arm or extension M' is screwed into the lower end of the lever M and reaches down through an opening $c^4$ in the casing C at one side of the oil-trough C'. The arm M' is adapted to be connected with the stopping-mechanism of the machine to be controlled in any suitable manner, Fig. 1 illustrating a convenient arrangement. As here shown X indicates a detent-lever or "dagger" as it is sometimes called when employed in textile machinery, and Z is the main stopping-lever operated by a spring $z$ to shift the driving-belt or to throw out a clutch as usually provided, but not herein shown or described. The lever Z has its end $z'$ resting against a detent-shoulder $x$ on the lever X to restrain it from movement under the action of its spring $z$. Connecting the lever X with the arm M' of the lever M is a link or rod X', and it will be understood that when the lever M is allowed to rock in the direction indicated by the arrow 7, Figs. 1 and 3, the link X' will act to throw off the lever X to release the lever Z and thereby cause the operation of the stopping-mechanism of the machine as usually provided.

It is also to be noted that the rod X' which connects the arm M' of the lever M with the lever X is somewhat loosely joined thereto at either end. That is to say, the loops at the ends of the rod X' are hooked into enlarged holes in the arm M' and lever X to provide for a slight play or lost motion between the parts. This allows the lever M to rock slightly in the direction opposite to that indicated by the arrow 7, Fig. 1, to permit the extension or arm O at the upper end of said lever, see Fig. 7, to ride up out of the depressions $t^2$ in the hub $t$ of the wheel T as the latter is turned. This arrangement provides for a restraining action between the arm O and the wheel T to prevent unwarranted turning of the latter in the manner as before explained.

Referring now to Figs. 1 and 2, the dial D' is marked on its front with one-hundred graduations corresponding to the hundred teeth on the registering element or ratchet-disk R. These graduations are numbered in units of ten, from "0" to "90" on the outer circle and in units of one-thousand from "0" to "9000" on the inner circle. Adapted to register with the graduations are the indicating-hands or pointers H and H' which are carried respectively by the shaft B and the bushing $b$ and rotated thereby in the direction indicated by the arrow 8, Fig. 1, or opposite to clockwise. The longer hand H is fitted to the reduced end of the pin B and keyed thereto by the spline $h$ with a nut $h'$ holding it in place thereon, see Fig. 2. The shorter hand H' fits the outer end of the bushing $b$ and is held in place against a shoulder $b^3$ by means of a spring-clip $b^6$ snapped into an annular groove $b^4$ on the bushing, while a key $b^5$ holds it rotatively therewith.

The hand H' is formed with an enlarged, circular hub-portion $h^2$ to the front of which is secured a ring $h^3$, see Fig. 2, having a groove $h^4$ scored in its periphery. Frictionally engaging the groove $h^4$ is a wire spring-ring Q having one of its ends bent radially outward to form a pointer or supplementary hand $q$, see Fig. 1. The pointer $q$ may be set in relation to the hand H' by moving it clockwise around the ring $h^3$, but when it is turned in the opposite position its spring-ring Q acts to bind in the groove $h^4$ so that the hand H will be turned with it.

At the outer end of the hand H is a spring plunger-pin $h^6$ adapted to be operated from a finger-button $h^7$ to engage the hand with the pointer Q so that all three hands may be moved together to set them as later explained. As shown in Fig. 7, which is an enlarged, detail view, the plunger-pin $h^6$ extends through a bore in a bearing-member $h^8$ riveted through the hand H and at its outer end the pin is riveted through the top of the button $h^7$. A coiled spring $h^9$ is pocketed in a counter-bore in the member $h^8$ and tends to maintain the pin $h^6$ with its head $h^{10}$ bearing against the under side of the hand H. By pressing on the button $h^7$ the pin $h^6$ can be forced inwardly to engage it with the pointer Q to move the hand H' therefrom.

Referring to Figs. 1 and 2, the inner rim of the casing C is scored with a shallow groove $c^5$, and fitted thereto is a wire spring-ring $D^2$. One end $d^4$ of the ring $D^2$ is bent radially inward to bring it into position adjacent the index graduations on the dial D' and within the range of movement of the hand H. Normally the end of the hand H will ride above the end $d^4$ of the ring $D^2$ but by bending the hand toward the dial slightly it will strike against the member $d^4$ to limit the movement of the hand. The stop-ring $D^2$ may be turned clockwise around the rim of the casing C to bring its projection $d^4$ into any desired position on the dial D'. Movement of the ring in the opposite direction is resisted by its spring action tending to cause it to frictionally bind in the groove $c^5$. The purpose of the ring $D^2$ is to act as an adjustable limit for resetting the hands H, H' after the indicator has performed one operation, it being more convenient to bring the hands against a fixed stop than to return them to a particular graduation each time they require resetting. The method of operation of the complete apparatus is as follows:

When my improved indicator and stop-device is used in connection with a braiding, winding or other textile machine, I employ the grooved pulley W as a driving element or in some cases a drum might be used in its stead. When the device is to be used in counting revolutions, or registering other operations of a going element, however, it is connected thereto by gearing, or equivalent means for turning the shaft S. As applied to a braiding or winding machine the cord, thread or yarn $y$ leading from or to the machine is given one or more turns around the wheel W and the draft of the material will rotate the wheel to drive the shaft S and turn the worm-gear G. As herein illustrated the wheel W is eighteen inches or one-half a yard in circumference and hence two rotations of the wheel will measure off one yard. The ratio between the worm $s^2$ and its gear G is 200 to 1 so that two-hundred turns of the wheel W, measuring one-hundred yards, will turn the gear G through one complete rotation, but it will be obvious that these ratios may be altered as desired.

Referring to Fig. 2, the worm-gear G drives the disk E through its friction clutch-spring $f'$ at an equal rate of speed and the shaft B with its attached hand H are rotated therefrom. The hand H will therefore make one rotation around the dial D' for each two-hundred turns of the wheel W during which one-hundred yards will be measured corresponding with the number of graduations on the face of the dial D'. In other words, each graduation on the dial D' indicates one yard of material measured, but other units of measurement may be adopted if desired.

Each time the disk E turns through a complete rotation, with the hand H traveling from "0" back to "0" again in a direction opposite to that of the hands of a clock, the tooth $e$ on the periphery of the disk, see Fig. 3, will actuate the lever L to cause the pawl P to advance the ratchet-disk R one tooth. The ratchet R is mounted fast on the bushing $b$, see Fig. 2, and hence the short hand H' carried by the bushing will turn with the ratchet. As before explained, there are one-hundred teeth on the ratchet R which correspond to the number of graduations on the dial D' and therefore the hand H' will be moved from one graduation to the next to indicate one-hundred yards measured during each complete rotation of the disk E and hand H. One-hundred rotations of the disk E and hand H are therefore required to move the hand H' once around the dial D' to indicate ten-thousand yards. The hands H and H' are so fixed relatively to the disks E and R that when they come together at the "0" point the two slots $f^3$ and $k$ on the peripheries of their respective plates F and K will be brought into register. Therefore, in setting the device to measure one-hundred yards, for instance, the short hand H' will be adjusted to a point one graduation to the right of "0" while the long hand H will be placed directly on "0." Now, when the machine to which the device is applied is started the wheel W will be rotated from the draft of the yarn $y$ and as the gear G is turned therefrom through a complete rotation during the reeling off of one-hundred yards, the hand H will be moved once around the dial. As the hand H approaches the mark at which the short hand H' is set the tooth $e$ on the disk E operates the arm L and pawl P to move the ratchet-disk R one tooth and both hands will then be moved to "0" concurrently. As the two hands register "0" the two slots $f^3$ and $k$ come into register and the stop-control lever M is allowed to be rocked by its spring N. The rocking of the lever M forces the "dagger" X off from the stopping-lever Z and the latter will then act to arrest the operation of the machine as previously explained.

When less than one-hundred yards are to be measured the short hand H' is set at the same point, one graduation to the right of "0" as illustrated in Fig. 1, and the long hand H is moved to the number on the outer rim of the dial indicating the yardage required. For instance, in measuring eighty-five yards the hand H is set half-way between "80" and "90" on the dial and after the worm-gear G has been turned to bring it to "0" the short hand H' will also have been moved back to "0" and the notches $k$ and $f^3$ will be in register to allow the operation of the stop-control lever M. In measuring more than one-hundred yards the short hand H' is set a greater number of graduations to the right of "0" in accordance with the number of "hundreds" required, the numerals on the inner circle indicating the "thousands" as shown in Fig. 1. If an odd number of units is required instead of even "hundreds" or "thousands", the long hand H is adjusted to the tens graduations on the outer circle of the dial as before explained.

With the method of adjusting the mechanism as above described the device can be set to register any number of units up to ten-thousand. When it is required to extend its range of action beyond this limit the supplemental wheel T is brought into play. With the wheel T set to indicate "0" as illustrated in Fig. 1, the movement of the pawl V with the ratchet R has no effect to turn the wheel. The hub $t$ of the wheel T therefore remains in the position shown in Fig. 3 with its notch $t^3$ opposite the end $o'$ of the arm O so that the lever M is free to move when the two notches $f^3$ and $k$ on the plates F and K come into register. When, however, the wheel T is turned out of this position to indicate any of its numerals from "1" to "9," the slot $t^3$ in its hub $t$ will be moved out of alinement with the end of the lever O so that the letter will bear on the periphery of the hub. It will be observed from Fig. 3 that the end $o'$ of the lever O is rounded off to adapt it to ride out of the notch $t^3$ when the wheel T is turned by hand, while normally it acts as a yielding detent for the wheel to prevent unwarranted movement thereof. Also, when the end of the lever O bears against the periphery of the hub $t$ it will seat in the depressions thereon to provide a check against accidental turning of the wheel T. With the wheel T set as above described to indicate any of its numerals, say "5" for instance, it must be turned through the space of five teeth to again bring its slot $t^3$ into position to permit the entrance therein of the lever O. The rotation of the wheel T is effected with a step-by-step progression, through the engagement of the pawl V with its teeth $t^4$. Each time the ratchet R completes a rotation the pawl V carried thereby will move the wheel T one step, so that with the wheel set at "5" it will require five turns of the ratchet to turn it back to "0." During this time the short hand H' will have made five revolutions about the dial D' indicating five times ten-thousand or fifty-thousand units. When the wheel T is set in this manner the hand H' is set at one mark to the right of "0" on the dial D' as in adjusting the device for thousands, and the hand H may be set for any odd number in excess of the even thousands. In setting the mechanism for registering one-hundred-thousand units, however, the wheel T is turned to indicate "9" and the hand H' adjusted to "0." The hand H will also be set at "0" and therefore the two notches $k$ and $f^3$ will be in register opposite the finger $m'$ on the lever M, but the latter will be held from action by the arm O bearing against the hub $t$ of the wheel T. With this adjustment of the mechanism the hand H' will make nine revolutions before the wheel T is turned back to "0," but during its ninth revolution it passes the mark "0" before the wheel T reaches "0" and therefore must make one more revolution before all of the notches $f^3$, $k$ and $t^3$ are in position to allow the lever M to act. In this way ten revolutions of the hand H' are required to trip the devices which actuate the stopping-mechanism of the machine and hence ten times ten-thousand or one-hundred-thousand units will have been registered.

When the device is employed to register any fixed number of units of measurement or to count a certain number of operations and then stop the machine to which it is attached, if it is desired to repeat its operation in this manner for an extended period, the most convenient method for resetting the hands H and H' is as follows: Referring to Fig. 1, if the device is to be adjusted for registering eighty-five units, for instance, the hand H' is first set one point to the right of "0" and the pointer $g$ is then carried around by sliding its ring Q on the hub $h^4$ of the hand to bring it to the eighty-five mark on the dial D'. The spring-ring $D^2$ is then slid around in its groove in the casing C to bring its stop-member $d^4$ in line with the pointer, also at the eighty-five mark. Now, before the machine is started each time, the hand H is moved around the dial by grasping the finger-button $h^7$ while also pressing the plunger-pin $h^6$ inwardly against the action of its spring $h^9$. The hand H is turned always in the direction indicated by the arrow 8, Fig. 1, and when the head $h^{10}$ of the pin $h^6$ comes into contact with the pointer $q$ it will move the latter with the hand H thus serving to turn the hand H' in the same direction. As the hand H approaches the point at which it is to be set a further pressure is applied to the finger-button $h^7$ and this acts to bend the hand slightly toward the dial so that its end will bring up against the stop $d^4$ to arrest its movement at the predetermined setting point. In this way, by adjusting the pointer $q$ in proper relation to the hand H' and fixing the stop $d^4$ at the point desired, the two hands H and H' may be moved together and set back to the proper marks by a very simple and convenient operation. It has before been explained that when the hands H and H' are both at "0" the finger $m'$ on the lever M will be engaged with the notches $f^3$, $k$ in the plates F and K. Immediately the disk E with its plate F is moved, however, by the manual turning of the hand H the beveled side of the notch $f^3$ will act to lift the finger $m'$ out of the notch $k$ and the disk R will then be free to turn to allow the settting of the hand H'.

It will be observed that my invention provides a very simple and compact registering-device, capable of an extended range of action and adapted for automatically arresting the operation of the machine to which it is attached. It may be applied to a variety of uses, is positive and accurate in its action, and may be conveniently and quickly reset for repeated operations. Various modifications might be made in the construction and arrangement of the mechanism of the device and the manner of applying it to use without departing from the spirit or scope of the invention; therefore, without limiting myself to the exact embodiment shown, what I claim is:—

1. In a measuring-device, the combination with a measuring-wheel adapted to be rotated by the material to be measured, of a train of gearing driven from said wheel, a disk continuously rotated from said gearing, said disk formed with a single tooth projecting from its periphery, a toothed ratchet mounted to rotate independently of the disk on the same axis therewith, a pawl pivoted adjacent the periphery of the disk to adopt it to be operated by the tooth on the periphery of the latter, said pawl arranged to engage the ratchet to advance the latter one tooth at each rotation of the disk, an indicating-member rotated by and with the disk, and a second indicating-member rotatable by and with the ratchet at a different rate of speed from that of the first member.

2. In a measuring-device, the combination with a measuring-wheel adapted to be rotated from the material to be measured, of gearing driven from said wheel, a disk driven from the gearing and formed with a single tooth projecting radially from its periphery, a ratchet rotatable independently of the disk on the same axis therewith, a lever pivoted adjacent the disk to be rocked by the action of the tooth on the latter engaging therewith, a pawl pivoted on the end of the lever to adapt it to engage the teeth on the ratchet to advance the latter one tooth at each rotation of the disk, an indicating-means carried by and moved with the disk, and a second indicating-means carried by and moved with the ratchet at a different rate of speed from that of the first indicating-means.

3. In a measuring-device, the combination with a measuring-wheel adapted to be rotated from the material to be measured, of a driving-gear driven from said wheel, a disk rotatable on a common axis with the gear and formed with a single tooth on its periphery, a friction-clutch connecting the disk to be driven from the gear while allowing it to be adjusted manually independently thereof, a toothed ratchet, a pawl adapted to be actuated by the tooth on the disk to advance the ratchet with a step-by-step motion, an indicating-means moved by and with the disk, and a second indicating-means moved by and with the ratchet at a different rate of speed.

4. In a registering-device, the combination with a driving-gear, of a disk rotatable on the same axis as the gear and provided with an annular groove, a spring-ring frictionally engaging said groove with one of its ends secured to the gear, a rotatable ratchet, means for advancing the ratchet a fraction of a rotation at each rotation of the disk, and separate indicating-means operated from the disk and ratchet at different rates of speed.

5. In a registering-device, the combination with a driving-element, of a rotatable shaft, a disk fast on said shaft, a friction-clutch for rotating the disk from the driving-element while allowing it to be turned independently thereof, an indicating-hand operated by the shaft, a ratchet free to rotate on the shaft, means operated by the disk to turn the ratchet through a fraction of a rotation at each rotation of the disk, and a second indicating-hand operated from the ratchet.

6. In a measuring-device, the combination with a rotatable measuring-wheel adapted to be driven by the material to be measured, of gearing driven from said measuring-wheel, a disk continuously rotated from the gearing, indicating-means driven by and with the disk, a toothed ratchet, means operated by the disk to advance the ratchet one tooth at a time at each complete rotation of the disk, indicating-means driven from the ratchet, a third supplemental indicating-means, means to maintain said last named indicating-means normally inactive, and means to set the supplemental indicating-means to cause it to be operated from the ratchet.

7. In a registering-device, the combination with a rotatable disk, of indicating-means operated therefrom, a ratchet, means to advance the ratchet with a step-by-step movement at each rotation of the disk, a second indicating-means operated from the ratchet, a pawl carried by the ratchet, and a second ratchet arranged to be normally inactive but adapted to be set to cause its operation from the pawl carried by the first ratchet.

8. In a registering-device, the combination with a rotatable disk, of indicating-means operated therefrom, a ratchet, means to advance the ratchet at each rotation of the disk, a second indicating-means operated from the ratchet, a pawl carried by the ratchet, and a second ratchet formed with a missing tooth whereby it may be turned to clear the pawl on the first ratchet or to be set to be engaged thereby to render it operative therefrom.

9. In a registering-device, the combination with a rotatable element, of a pawl carried thereby, a ratchet-wheel having evenly spaced teeth with one tooth missing, and detent-means for maintaining said ratchet-wheel in position to be clear of the pawl on the rotatable element while allowing it to be turned to bring its teeth into position to be engaged thereby to cause the rotation of the ratchet-wheel.

10. In an indicator and stop-device, the combination with a rotatable disk having a tooth on its periphery and a notch in its edge, of a ratchet rotatable on the same axis and also having a notch adapted to register with the notch in the disk, a pawl operated from the tooth on the disk to advance the ratchet with a step-by-step motion, an indicating-hand operated from the disk, a second indicating-hand operated from the ratchet, and a stop-control lever arranged with its end riding on the disk and ratchet and adapted to enter the notches therein at a predetermined point in the rotation thereof.

11. In an indicator and stop-device, the combination with a rotatable disk having a notch in its periphery formed with an inclined side, of a ratchet rotatable therefrom with a step-by-step motion, said ratchet having a rim provided with a notch in its periphery adapted to register with the notch in the disk, indicating-means operated from the disk and ratchet, and a stop-control lever having a finger riding on the rim of the ratchet and the periphery of the disk to adapt it to enter the notches therein and to be raised out of the notch in the ratchet by the action of the inclined portion of the notch in the disk when the latter is rotated with respect to the ratchet.

12. In an indicator and stop-device, the combination with a rotatable disk having a notch in its periphery, of a ratchet rotatable on the same axis and also formed with a notch adapted to register with the notch in the disk, means to rotate the ratchet from the disk, separate indicating-means operated from the disk and ratchet, a supplemental indicating-means comprising a ratchet-wheel adapted to be driven from the first ratchet, a hub on said wheel formed with a notch in its periphery, a stop-control lever having means normally riding on the rims of the disk and ratchet to adapt it to enter the notches therein when said elements have been carried into a predetermined relation with respect to each other, and an extension carried by the control-lever to ride on the hub of the ratchet-wheel to adapt it to enter its notch when the notches in the disk and ratchet are in alinement.

13. In an indicator and stop-device, the combination with a rotatable disk having a notch in its rim, of a ratchet also formed with a notch in its rim, means to rotate the ratchet from the disk at a different rate of speed, separate indicating-means operated from the disk and ratchet, a third supplemental indicating-means normally inactive but adapted to be set to be operated from the ratchet, a hub on said last named means having a notch in its periphery, a stop-control lever having means normally riding on the disk and ratchet to adapt it to enter the notches therein when the parts are brought into predetermined relation, and an extention pivoted on the end of said control-lever with its end adapted to bear on the hub of the supplemental indicating-means, and to enter the notch therein when the notches in the disk and ratchet come into register.

14. In a registering-device, the combination with a dial, of a hand rotatable around the dial, registering-mechanism for turning the hand, a hub on the hand and a pointer having a spring-ring engaging the hub to adapt it to be turned in one direction with respect to the hand but to resist movement of the pointer in the opposite direction.

15. In a registering-device, the combination with a dial, of hands rotatable thereon, means to turn the hands at different rates of speed, a pointer adapted to be adjusted in spaced relation with one of the hands, and means on the other hand adapted to be engaged with said pointer to move both of the hands together to set them at separate points on the dial.

16. In a registering-device, the combination with a dial, of hands rotatable thereon, means to turn the hands at different rates of speed, a pointer adapted to be set in spaced relation with one of the hands, and a finger-operated plunger on the other hand adapted to be engaged with the pointer to move both of the hands together to set them at separate points on the dial.

In testimony whereof I affix my signature.

CARL A. BRINK.

Copies of this patent may be obtained for five cents each, by addressing the "Commissioner of Patents, Washington, D. C."